Patented Oct. 2, 1951

2,569,906

UNITED STATES PATENT OFFICE 2,569,906

LIGHT-SENSITIVE EMULSIONS CONTAINING COLOR FORMERS CAPABLE OF YIELDING NONMIGRATORY AZINE DYESTUFFS

Albert C. Starke, Jr., Easton, Pa., assignor to General Aniline & Film Corporation, New York, N. Y., a corporation of Delaware No Drawing. Application December 23, 1947, Serial No. 793,530

7 Claims. (Cl. 95—6)

The present invention relates to color photography and more particularly to light sensitive silver salt emulsions containing color-formers capable of yielding by color-forming development azine dyestuff images which are non-migratory in said emulsions.

In copending application Serial No. 577,134, now abandoned, filed February 9, 1945, by Willy A. Schmidt and Joseph A. Sprung, there is disclosed the preparation of azine dyestuff images in photographic emulsions by color-forming development of exposed emulsions in the presence of an aromatic color-former containing in the 1-position an amino group and in meta-position thereto the grouping -NHZ wherein Z is a substituent more electronegative than hydrogen, for instance, a sulfonyl group. It is pointed out in this application that upon color-forming development of exposed light sensitive metal salt emulsions in the presence of such color-formers, there is first obtained a quinoneimine dyestuff image which is subsequently split with the elimination of the grouping —HZ and ring closure to the desired azine dye. This application also indicates that aromatic phenolic color-formers may also be employed, providing that in meta-position to the color-forming phenolic hydroxyl group there be present the grouping —NH-sulfonyl aryl. The phenolic type color-formers are not as active in the formation of the azine dyes as the amine type color-formers and it is only when the radical Z in the above group is aryl sulfonyl that the desired splitting and ring closure of the quinoneimine to the azine dyes takes place readily.

It is possible in the color-formers of said earlier application to employ as radical Z a component or group which is capable of rendering the color-formers non-migratory in the emulsions. However, inasmuch as such group is eliminated during the formation of the azine dye, it has been found that in many instances the azine dye is migratory although the component from which it is produced is non-migratory.

We have now discovered that color-formers capable of yielding non-migratory azine dyestuff images by color-forming development are those aromatic compounds containing in the 1-position a phenolic hydroxyl or an amino color-directing group, in the 3-position the grouping —NHSO₂R' and in another position of the ring other than the 4-position a radical similar to the aforesaid —NHSO₂R' group, R' being aliphatic or aromatic and being capable of rendering the component fast to diffusion in photographic emulsions. When employing color-formers of this type one of the groupings —NHSO₂R' in meta-position to the color-directing group is eliminated as in the prior work of Schmidt and Sprung. However, the other grouping of similar nature is retained and by virtue of its retention the azine dye formed on color development is precluded from migrating from one emulsion layer to another. Light sensitive emulsions containing color-formers of this character accordingly constitute the purposes and objects of the present invention.

The compounds which we contemplate herein for use in the emulsions may be characterized by the following formula:

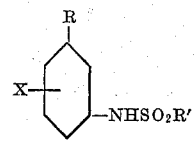

wherein R is primary amino, alkylamino, such as, methylamino, ethylamino, and the like, dialkylamino, such as, diethylamino, dimethylamino, and the like, or hydroxyl, X is R'SO₂NH—,

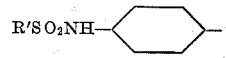

and

and R' is a radical capable of preventing diffusion of the color-former and the dye produced therefrom from photographic emulsions and R' is an aliphatic radical containing at least 10 carbon atoms or an aromatic radical which is substantive or contains an aliphatic radical of at least 10 carbon atoms, R' preferably being aromatic when R is hydroxyl. R' may be an aliphatic radical containing at least 10 carbon atoms, such as, alkyl, i. e., decyl, dodecyl, tetradecyl, hexadecyl, oleyl, octadecyl and the like, acylamino alkyl, i. e., decylaminoethyl, dodecylaminoethyl, octadecylaminoethyl, decylsulfonamidoethyl, dodecylsulfonamidoethyl and the like, or an aromatic radical which is substantive to photographic colloids or contains a radical containing at least 10 carbon atoms, such as, diphenyl, stilbene, phenoxyphenyl, alkylaminophenyl, i. e., decylaminophenyl, laurylaminophenyl, stearylaminophenyl, and the like, alkylphenyl, such as, decylphenyl, laurylphenyl, kerylphenyl (the product obtained by condensing chlorinated kerosene with benzene in the presence of aluminum chloride), and the like, acylaminophenyl, such as, decoylaminophenyl, lauroylaminophenyl, myristoylaminophenyl, myristoylsulfamyl, stearoyl sulfamyl, and the like.

In the compounds as indicated above the radical X may be present in any unoccupied position excepting the 4-position where reaction takes place between the color-former and the oxidation products of the primary amino developing agent. The 4-position may be occupied by groups capable of being replaced during the coupling reaction, e. g., halogen, sulfo, azo, etc.

Examples of compounds embraced by the above formula and which I have found to be suitable for my purpose are the following:

(1)
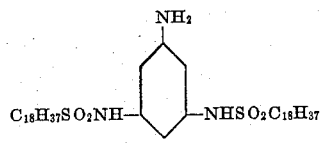
3,5-di-(octadecylsulfonamido)-aniline (2)
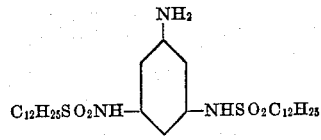
3,5-di-(laurylsulfonamido)-aniline (4)
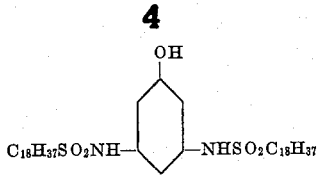
3,5-di-(stearylsulfonamido)-phenol (5)
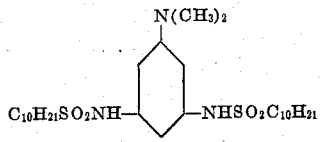
3,5-di-(decylsulfonamido)-N,N-dimethylaniline (6)
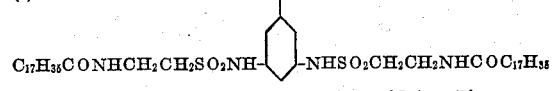
3,5-di-(stearoylamidoethylsulfonamido)-aniline (7)
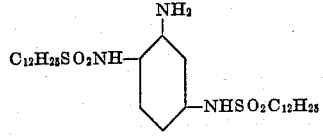
2,5-di-(laurylsulfonamido)-aniline (8)
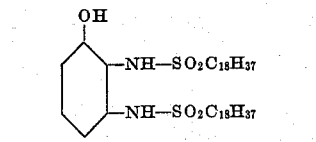
2,3-di-(octadecylsulfonamido)-phenol (9)
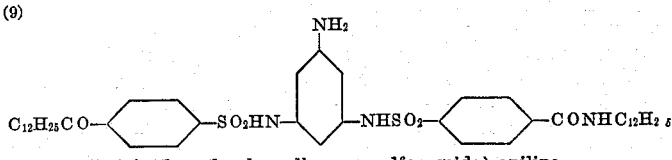
3,5-di-(p'-laurylcarbamylbenzenesulfonamido)-aniline

(10)
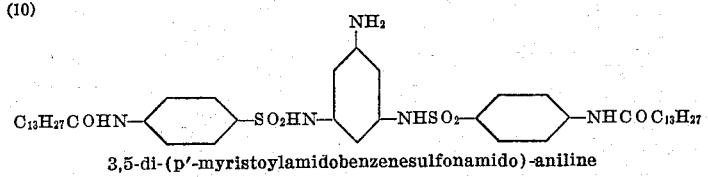
3,5-di-(p'-myristoylamidobenzenesulfonamido)-aniline

(11)
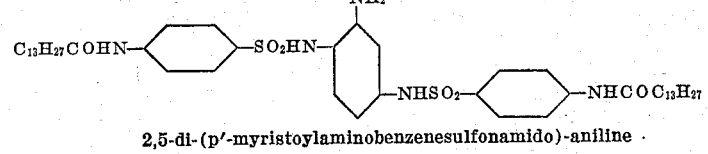
2,5-di-(p'-myristoylaminobenzenesulfonamido)-aniline (3)
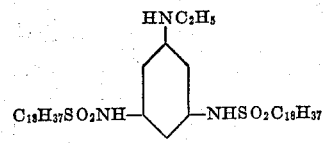
3,5-di-(stearylsulfonamido)-N-ethylaniline

(12)
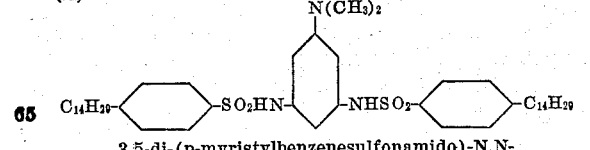
3,5-di-(p-myristylbenzenesulfonamido)-N,N-dimethylaniline

(13)
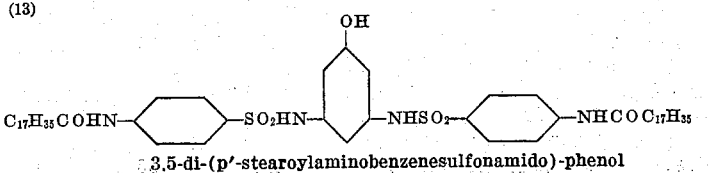
3,5-di-(p'-stearoylaminobenzenesulfonamido)-phenol (14)

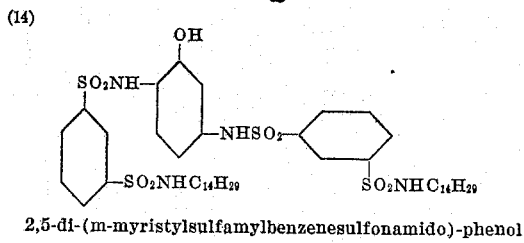

2,5-di-(m-myristylsulfamylbenzenesulfonamido)-phenol (15)

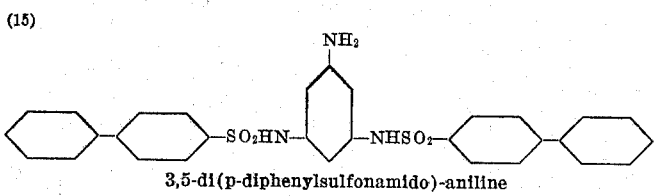

3,5-di(p-diphenylsulfonamido)-aniline (16)

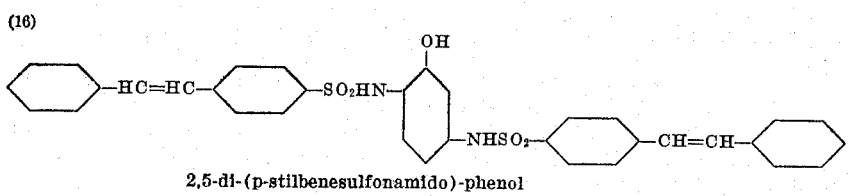

2,5-di-(p-stilbenesulfonamido)-phenol (17)

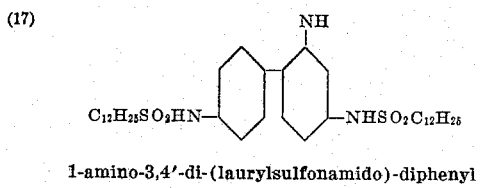

1-amino-3,4'-di-(laurylsulfonamido)-diphenyl (18)

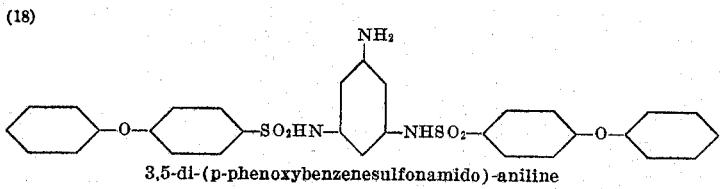

3,5-di-(p-phenoxybenzenesulfonamido)-aniline (19)

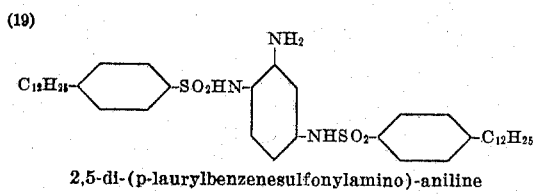

2,5-di-(p-laurylbenzenesulfonylamino)-aniline (20)

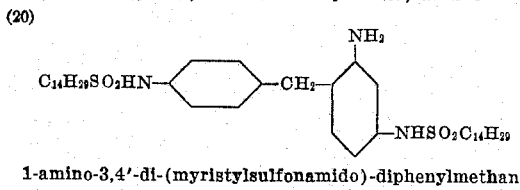

1-amino-3,4'-di-(myristylsulfonamido)-diphenylmethane

The aforementioned compounds may be produced by reactions conventional in the art. For instance, compounds of the type of Examples 1 and 2 and similar compounds are obtained by reacting a 1-nitro-phenylenediamine with a long chain alkyl sulfonyl chloride followed by reduction of the nitro group to an amino group. The long chain sulfonyl chloride is produced by the reaction of phosphorus pentachloride with the corresponding long chain sulfonate which is in turn formed by reaction of the corresponding long chain bromide with sodium sulfite.

It is unnecessary to start from the nitro compound when the 1-position of the color former contains a di-substituted amino group since in that event there is no possibility of reaction between the group in 1-position and the long chain sulfonyl chloride. In compounds containing primary and secondary amino groups, the reaction with sulfonyl chlorides has been found to take place with the primary amino group. Similarly, when the color former is a phenol one may start directly with a 1-hydroxy-phenylenediamine to produce the desired color formers.

The following is illustrative of a method of producing, for instance, the first compound listed above. A mixture of 333.4 parts of octadecyl bromide, 145 parts of sodium sulfite and 750 parts of water are placed in a bomb. After treating with nitrogen the mixture is heated to 200° C. and maintained at this temperature for 24 hours. The bomb is cooled and the semi-solid white, waxy material contained therein is removed. The solid is extracted with petroleum ether and dried in a vacuum oven.

139 parts of the sodium octadecyl sulfonate obtained as above are added slowly to 180 parts of phosphorus pentachloride. The mixture is stirred and heated on a steam bath for 36 hours whereupon 200 cc. of petroleum ether are added. The mixture is filtered through a Büchner funnel, the filtrate clarified by treatment with carbon black and the mixture heated. The filtrate is distilled to remove a portion of the solvent and then chilled to yield a grayish white solid.

A mixture of 12 parts of the octadecyl sulfonyl chloride produced as above, 100 cc. of ether, 3 parts of 1-nitro-3,5-phenylenediamine and 2.8 cc. of pyridine are mechanically stirred while heated on a steam bath. After refluxing for 24 hours the ether is removed by distillation. 50 parts of water are added to the residue and the resulting mixture heated to remove the unreacted amine and pyridine. The mixture is cooled to room temperature and the product resulting removed by filtration.

2 parts of the resulting 3,5-di-(octadecylsulfonamido)-nitrobenzene are dissolved in a mixture of 5 cc. of 2-N-sodium-hydroxide in 100 parts of distilled water. One-tenth gram of platinum oxide is thereupon added and the resulting mixture reduced by the application of a pressure of 60 pounds in a Parr hydrogenation apparatus. After the reduction of the nitro compound is complete the resultant colorless solution is filtered to remove the catalyst. The filtrate is neutralized with about 2.5 cc. of 2-N-hydrochloric acid. The resulting precipitate is filtered off and dried. The product obtained is the desired 3,5-di-(octadecylsulfonamido)-aniline.

The compounds of the type of those of Examples 15, 16 and the like can be obtained in an analogous manner by employing the arylsulfonylchloride in lieu of the alkylsulfonylchloride.

The compounds of the type of those of Example 6 can be obtained by reacting 1-nitro-3,5-phenylenediamine with taurinesulfonylchloride in the presence of an acid acceptor, such as, pyridine, the resulting compound reacted with stearoyl chloride followed by reduction of the nitro group to the amino group as in the specific procedure given above.

The compounds of the type of Example 10 and the like are rather difficult to prepare directly and it is, accordingly, recommended that there be formed first the 3,5-di-(acetamido benzenesulfonamido)-nitrobenzene, that the acetyl groups then be saponified with regeneration of the amino groups and that these then be reacted with the long chain acyl chloride followed by reduction of the nitro group. The difficulty of producing the compounds directly is attributable to the problems involved in working with such high molecular weight compounds, as for instance, myristoylaminobenzenesulfonyl chloride.

The following procedure illustrates how compounds of the type of Example 10 may be suitably prepared:

A 500-cc. 3-neck round-bottom flask equipped with stirrer, reflux condenser and solid dropping funnel was charged with 7.0 g. (0.0457 mole) of 5-nitro-m-phenylenediamine (prepared from trinitrobenzene by the method of Flürsheim, J. pr. Chem. 71, 538 (1900)), 100 cc. of benzene, 100 cc. of pyridine. To this mixture at room temperature was slowly added 23.3 g. of (0.10 mole) p-acetamidobenzenesulfonyl chloride (freshly prepared by the method recorded in Gilman Collective Volume I, p. 8) while the reaction mixture was stirred vigorously. Reaction started immediately upon addition of the p-acetamidobenzenesulfonyl chloride as shown by the separation of a dark oil. After 30 minutes the temperature began to fall. The mixture was heated to slow reflux for 3½ hours and then chilled and the upper layer was decanted from the heavy brown oil. The oil was added to 400 cc. of water and the mixture heated to remove the solvents by steam distillation. The pH of the mixture was adjusted to pH 10 by the addition of 10% sodium hydroxide solution. The mixture was heated for 5 minutes longer; then chilled and acidified with 10% hydrochloric acid. The resultant solvent was filtered off and dissolved in dilute 10% sodium hydroxide. The solution was treated with norite, filtered and the filtrate acidified with 10% hydrochloric acid. The resultant yellow solid weighed 22.7 g. and melted at 292° C. (decomposition).

A mixture of 16.5 parts of 1-nitro-3,5-di-(p-acetylaminobenzenesulfonamido)-benzene prepared as described immediately above, 20 parts of sodium hydroxide and 200 parts of distilled water are refluxed for 2 hours. The mixture is filtered and neutralized with dilute hydrochloric acid, the solvent recovered by filtration and dissolved in 150 cc. of hot alcohol containing 20 cc. of concentrated hydrochloric acid. The resulting solution is heated for 20 minutes and then cooled to room temperature. A 5% sodium hydroxide solution is added to the mixture until it possesses a pH of 4. On permitting the solution to cool slowly, tan crystals are separated which are filtered off and air dried. The product so obtained is 1-nitro-3,5-di-(p-aminobenzenesulfonamido)-benzene.

A mixture of 10.6 parts of said compound, 100 cc. of pyridine and 11.4 parts of myristoyl chloride is refluxed gently while stirring for 2 hours whereupon 500 parts of water are added. The solution is heated to remove the pyridine by steam distillation. The residue is cooled and 100 parts of water added thereto, the residue solidified and the resultant solid is recovered and dissolved in 300 cc. of hot ethyl alcohol. This mixture was diluted with 100 parts of distilled water and then cooled. A light yellow precipitate was formed and recovered by filtration and drying. The resulting product is 1-nitro-3,5-di-(myristoylaminobenzenesulfonamido)-benzene.

This nitro derivative is reduced to the corresponding 1-amino compound by the same procedure utilized in effecting reduction of the nitro compound to the amino compound of Example 1.

Compounds of the nature of those of Example 12 can be prepared by reacting the myristylbenzenesulfonyl chloride with 1-dimethylaminophenylenediamine.

The compounds of the type of Example 14 may be prepared by reacting the diamino phenol with the di-sulfonyl chloride of meta-benzene disulfonic acid and reacting the resulting compound with myristyl amine.

The azine dyes are produced from the aforementioned color-formers in two reactions which may take place spontaneously or in an observable sequence, the first reaction involving the formation of the quinoneimine dye from the colorformer and the oxidation products of a primary aromatic amino developer and the second involving ring closure of the quinoneimine to the azine. The azine compounds so formed may be present as the anhydride of the free base. Upon acidification, however, the true azine salt is formed which possesses a characteristically brilliant color. For effecting acidification there may be used inorganic or organic acids, such as, hydrochloric, phosphoric, sulfuric, trichloroacetic, acetic, benzenesulfonic acid, and the like.

The color formers in which the color directing group is phenolic hydroxyl do not form the azines as readily as the corresponding compounds containing an amino group as the color-directing group. We have ascertained that ring closure of the quinoneimines obtained from the phenols can be facilitated by an additional treatment before the acidification step, such as, by immersing the color developed film in a dilute solution of an alkali, such as, sodium hydroxide.

The developers employed with the colorformers are of the primary aromatic amine type, preferably phenylenediamine, such as, p-aminodimethylaniline, p-aminodiethylaniline, and the like.

The course of the reaction in which it is possible to observe definite steps may be illustrated by the following equation involving the reaction between the oxidation products of aminodimethylaniline and 3,5-di-(p-myristoylaminobenzenesulfonamido)-aniline:

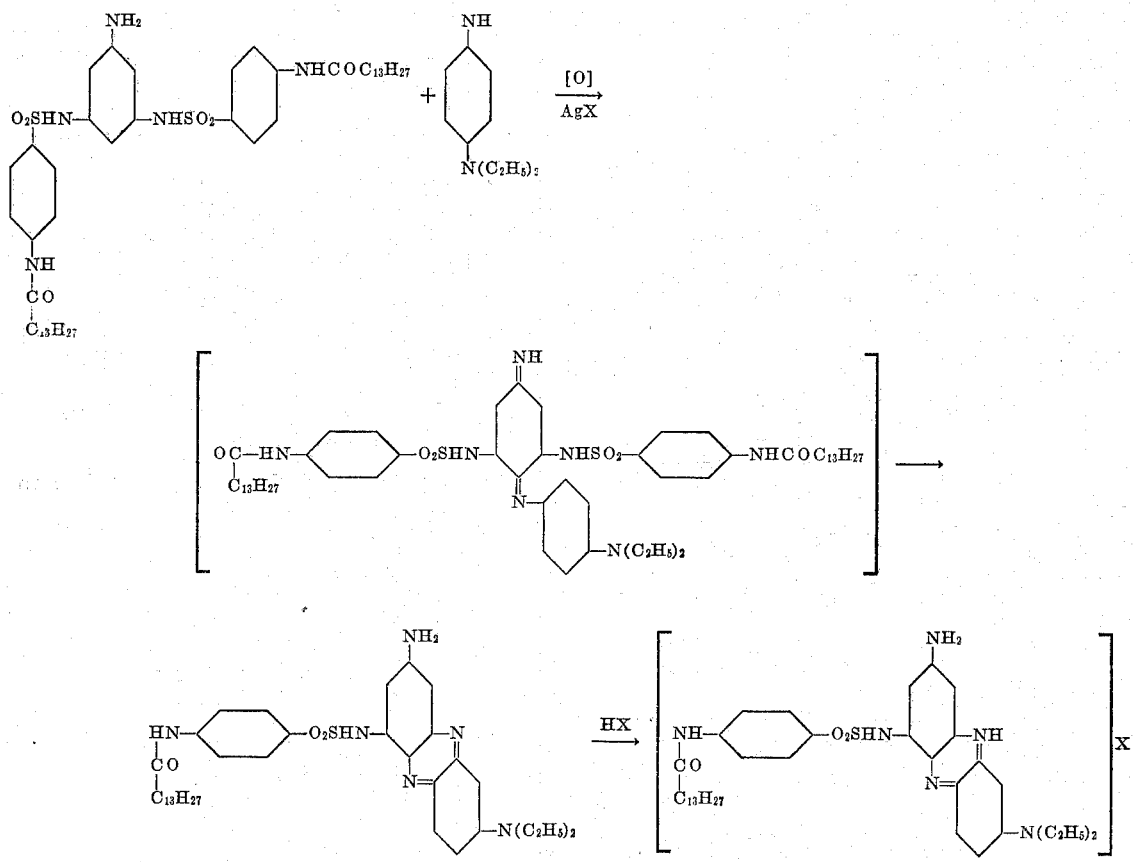

where HX is an acid of the type heretofore mentioned.

Inasmuch as the color-formers contain groups rendering them non-migratory in photographic emulsions they must be employed while dispersed in said emulsions. The resulting emulsions may be used for the purpose of producing negatives, reversed images and negative or positive prints.

The color-formers are admirably suited for use in the photographic emulsions for the reason that they are non-diffusing, have an extremely high purity and are alkali soluble. As a consequence they may be readily dissolved in water containing a small amount of alkali and dispersed in the photographic emulsions.

The azine dyes produced from the color-formers are stable toward light and chemical reagents and hence are an improvement over the usual quinoneimine or azo methine dyes formed by color-forming development. The characteristic hump of the magenta quinoneimine dyes produced from parazolones is not noted in the azine-type dyestuffs. Consequently, transmission in the red region is greatly improved.

The following examples will serve to illustrate the invention but it is to be understood that the invention is not limited thereto:

Example 1

A mixture of .25 gram of 3.5-di-(p-myristoylaminobenzenesulfonamido)-aniline, 1 cc. of distilled water and 1 cc. of 2-N-sodium hydroxide solution was ground until the solid completely dissolved. The resulting mixture was stirred into 50 cc. of a photographic emulsion and the emulsion coated on a suitable base. The film thus obtained was exposed and developed in the following developer:

| | Parts |
|---|---|
| Water | 1000 |
| Sodium sulfite | .5 |
| p-Diethylaminoaniline | 2.5 |
| Sodium carbonate | 70 |
| Potassium bromide | 2.5 |

A silver plus orange dyestuff image was thus obtained. After removal of the silver by bleaching in potassium ferricyanide solution and treatment of the resulting film with a 10% phosphoric acid solution, a magenta dye image was obtained.

Instead of developing the exposed film in a color-forming developer it may be developed to give a black and white negative image. The residual silver halide is then exposed and color-developed with the above solution. After working up the film as above a reversed magenta azine dyestuff image is obtained.

Example 2

The procedure is the same as in Example 1 excepting that there is used as the color-former 3,5-di-(tetradecylsulfonamido)-aniline. A magenta azine dyestuff image is thus obtained in this instance also.

Example 3

The procedure is the same as in Example 1 excepting that there is used 3,5-di-(p-myristylbenzenesulfonamido) - N,N - dimethylaniline. A magenta azine dyestuff image is also obtained in this instance.

Example 4

The procedure is the same as in Example 1 excepting that there is used as the color-former 3,5 - di - (p - stilbenesulfonamido) - phenol. A magenta azine dyestuff image is also obtained.

I claim:

1. A photographic silver halide emulsion capable of yielding azine dyestuff images upon exposure and color development with a primary aromatic amino developer containing as the color former a compound of the following formula:

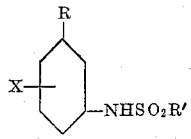

wherein R is a member of the class consisting of amino and phenolic hydroxyl groups, X is a member selected from the class consisting of groups of the following formula:

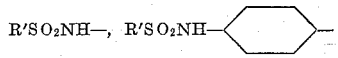

and

and R' is a member selected from the class consisting of aliphatic and aromatic radicals.

2. A silver halide emulsion containing as a color former fast to diffusion and capable of yielding azine dyestuff images on color-forming development, the compound 3,5-di-(p-myristoyl-amino-benzenesulfonamido)-aniline.

3. A silver halide emulsion containing as a color former fast to diffusion and capable of yielding azine dyestuff images on color-forming development, the compound 3,5 - di - (octa - decylsulfonamido)-aniline.

4. The photographic silver halide emulsion as defined in claim 1 wherein R' is an aliphatic radical containing at least ten carbon atoms.

5. The photographic silver halide emulsion as defined in claim 1 wherein R' is a group which is substantive to gelatin.

6. The photographic silver halide emulsion as defined in claim 1 wherein R' is an aromatic radical containing an aliphatic group of at least ten carbon atoms.

7. The process of producing azine dye images in a photographic silver halide emulsion, which comprises exposing the emulsion of claim 1 and developing it with a primary aromatic amino developer.

ALBERT C. STARKE, Jr.

REFERENCES CITED

The following references are of record in the file of this patent:

UNITED STATES PATENTS

| Number | Name | Date |
|---|---|---|
| 2,367,531 | Salminen et al. | Jan. 16, 1945 |
| 2,389,575 | Kirby et al. | Nov. 20, 1945 |
| 2,423,730 | Salminen et al. | July 8, 1947 |

FOREIGN PATENTS

| Number | Country | Date |
|---|---|---|
| 503,752 | Great Britain | Apr. 11, 1939 |